United States Patent [19]
Abbey

[11] Patent Number: 5,359,977
[45] Date of Patent: Nov. 1, 1994

[54] FLUIDIC METERING SYSTEM

[76] Inventor: Harold G. Abbey, 12735 Headwater Cir., Wellington, Fla. 33414

[21] Appl. No.: 41,147
[22] Filed: Mar. 30, 1993

Related U.S. Application Data

[63] Continuation of Ser. No. 795,928, Nov. 20, 1991, abandoned.

[51] Int. Cl.[5] .................. F02M 41/00; F02D 9/08
[52] U.S. Cl. ................................. 123/452; 123/337
[58] Field of Search ............... 123/452, 453, 454, 455, 123/337

[56] References Cited

U.S. PATENT DOCUMENTS

| | | | |
|---|---|---|---|
| 3,845,750 | 11/1974 | Harings | 123/452 |
| 4,099,505 | 7/1978 | Stumpp | 123/452 |
| 4,152,375 | 5/1979 | Muller | 123/452 |
| 4,174,692 | 11/1979 | Wessel | 123/455 |
| 4,370,967 | 2/1983 | Gmelin | 123/452 |
| 4,646,706 | 3/1987 | Emmenthal | 123/452 |
| 4,895,184 | 1/1990 | Abbey | 123/452 |
| 5,090,390 | 2/1992 | Feldinger | 123/494 |

Primary Examiner—Carl S. Miller
Attorney, Agent, or Firm—Malin, Haley, DiMaggio & Crosby

[57] ABSTRACT

A fluid-mechanical variable Venturi metering system having a contoured moveable element in an intake casing to an internal combustion engine whose shape and Venturi air passage(s) results in automatic shifting of the moveable element by aerodynamic force as a function of the mass-volume of the air passing through which with levers produces amplified outputs of displacement, countervailing force and differential air velocity pressure (Venturi vacuum) proportional thereto and compensating for temperature, moisture content and pressure whereby an output or combination of outputs or transducing of outputs applied to fuel control devices and systems provides air-fuel mixtures in optimum ratio for the entire speed-load range of the modern engine for naturally aspirated and supercharged Fuel Injection and Carbureted Injection systems.

7 Claims, 8 Drawing Sheets

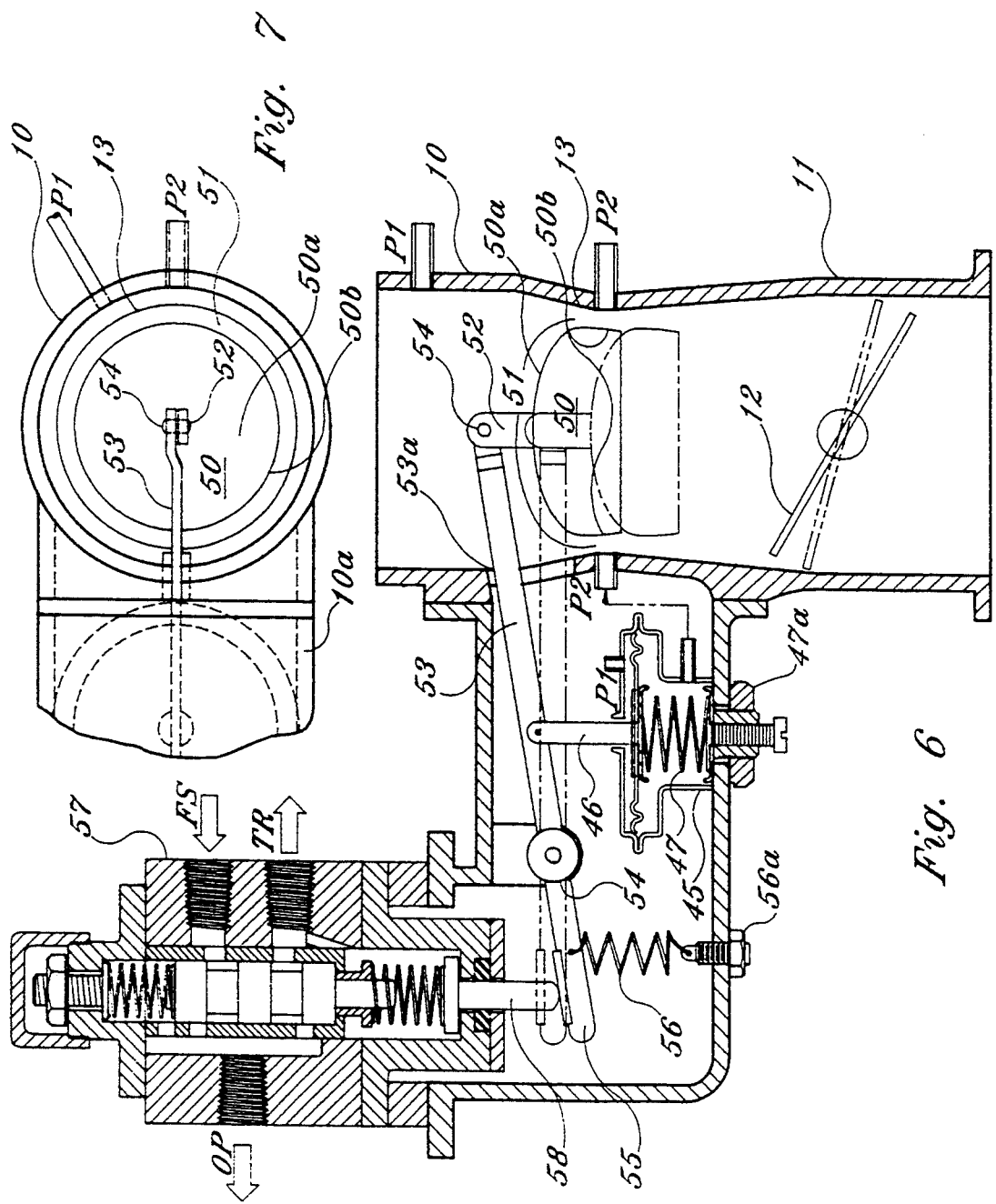

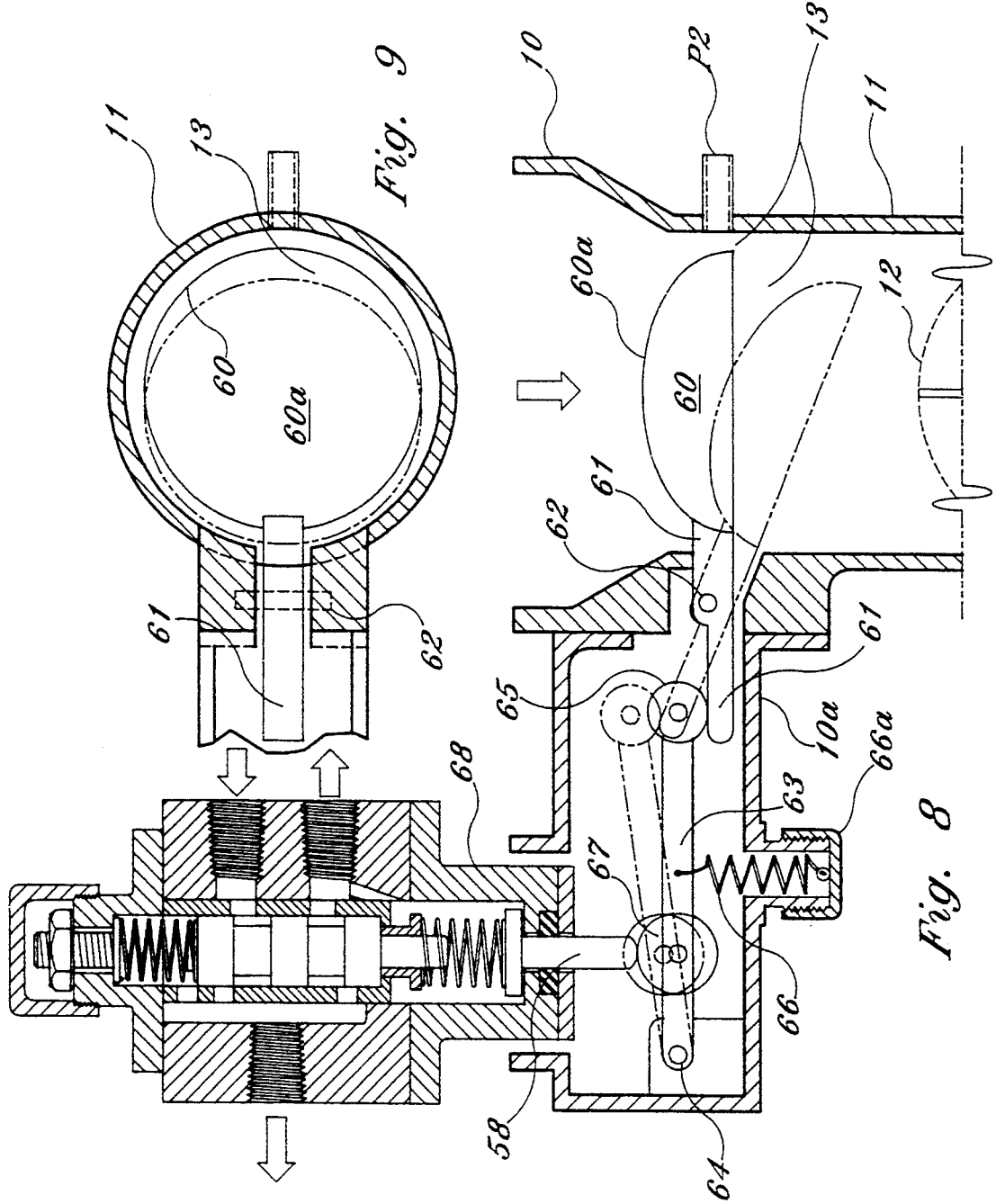

FLUIDIC METERING SYSTEM

This is a continuation of copending application Ser. No. 07/795,928 filed on Nov. 20, 1991, now abandoned.

BACKGROUND OF THE INVENTION

1. Field of the Invention

This invention relates generally to fueling systems for internal combustion engines and more particularly to air-intake metering and control of fuel quantity in proportion thereto and blending therewith comprising moveable elements in the confines of tubular conduit thereby yielding outputs applicable to fuel regulating devices for fuel-to-air proportioning control and fuel dispersion device in the air stream.

2. Description of the Prior Art

Prior art relating to the metering of air flow by mechanical air flow sensors utilized in fuel injection systems for spark ignition internal combustion engines in automotive application for control of fuel quantity in optimum ratio thereto have been of two principal types.

The major components of one such system are the pivotally arranged baffle plate in an air Venturi, whose movements actuate the control piston of a fuel quantity and distributing valve to fuel injectors.

The major components of another type system are "an air flow sensor flap", in essence a pivoting vane in a "measuring duct" section together with a "compensation flap" an integral part of the sensor flap in a chamber aside from the airflow path. Both devices have flat plane upstream surfaces that measure the force of the impinging air stream by the counteracting force of a "return spring" or the control pressure force of a fuel control valve.

A flat baffle plate in a Venturi intake tube is the metering sensor of the Mercedes-Benz Continuous Injection System (CIS), and the Bosch K-Jetronic fuel injection system.

The pivoting vane and flap are transduced to electric switching and signal to microprocessor control of solenoid operated injectors constituting the air flow sensor of the Bosch L-Jetronic fuel injection system.

In both systems, the use of a flat surface of a baffle plate or vane reacting to impinging air flow conditions requires empirical solutions and auxiliary systems for the effects of turbulence and non-linear outputs at a steady state of flow conditions and particularly during transitional conditions of acceleration and deceleration by throttle control of airflow. This causes fluctuation and oscillation from the effects of differential pressure on the relatively large flow impeding surfaces before and after airflow is accelerated or retarded to the steady state condition.

Also in use are electronic meters such as "hot wire" and "sonic" sensing for operation in conjunction with microprocessors in systems designated as Electronic Fuel Injection (EFI).

All such metering systems presently in use for "fuel injection" systems are in conjunction with devices or systems for control of fuel quantity by controlling fuel pressure to pressure-atomizing injectors (continuous injection) and for intermittent discharge of electric injectors under constant fuel pressure (Electronic Fuel Injection both systems injecting into intake valve passages of individual cylinders (ported injection).

Certain U.S. patents of applicant disclose the new "variable Venturi" structure technology wherein an element of the structure being a member movably supported in a tubular casing through which a fluid is caused to flow around and through said member, said member being contoured and streamlined, the forces engendered by said fluid flow on said member are governed by the laws and principles of fluid dynamics and similar to those of aerodynamics for atmospheric air.

When the moveable element of such structure is encompassed by an air stream and constrained to non-turbulent streamlined flow through Venturi-like passages, the force imposed by said air stream on such element urges such member downstream. When downstream movement by such force is opposed by a counterforce such as a spring of linear tension the extent of displacement of the moveable member and the magnitude of countervailing force are outputs proportional to the mass-volume of air flow.

The contouring of such confined streamlined members to form Venturi-Like passages which vary by said members movement also yields a differential air velocity pressure output taken from the varying throat section of such structures which differential-velocity pressure is proportionate to mass-volume of the prevailing air flow.

The referenced patents of this inventor disclose various shaped members which positioned in an air stream confined to a tubular duct which function as flow rate meters responsive to the aerodynamic force of the air stream on the structure's shaped members. The prevailing aerodynamic force being countervailed by a spring as the force storage device provides physical outputs that are a measure of air flow quantity. These outputs are: differential air pressure, called Venturi vacuum, the extent of displacement of the moveable element, and the magnitude of countervailing force, each of which are proportional to mass-volume of the air flow.

A system in accordance with the invention is applicable to spark-ignition internal combustion engines to proportion the ratio of combustion air to fuel, to maintain an optimum ratio thereof under varying conditions of load and speed throughout a wide operating range and for various systems of carburetion and fuel injection.

Although the structures of this invention provide the function of metering the air for control of fuel in optimum ratio thereto and having the capability of introducing the fuel into the metered air stream by a single continuous injector discharging into an interior passage of the moveable member, they also serve for proportioning fuel control in fuel injection systems that control fuel into cylinder air intake passages (ported injection).

Operational control of internal combustion engines in automotive operation is by means of an arbitrarily actuated throttle valve in an air intake casing of an air intake manifold. The air metering devices and the structures of the subject invention are in the intake casing upstream of the throttle valve and therefore subject to the pressure and velocity changes of the air flow that results from sudden or rapid throttle position change.

A body movably supported in a tubular casing, wherein an air stream is caused to flow therethrough encompassing the said body subjects the body to the following forces:

(a) impingement on the upstream projected surfaces by the change of direction of the stream flow. (F=MA).

(b) skin friction on the surfaces subjected to the flow.

The air stream flowing through a tubular casing that confines the moveable body in a passage surrounding same introduces additional forces occurring when throttle induced changes airflow from steady state conditions. These are:

(c) the instant static pressure differential across the moveable body acting on the body before a steady state of air flow and member movement pertains.

Non-streamline shaped bodies such as flat and angled plates because of the sharp directional change of the flow stream yields a considerable impingement force causing turbulent flow and frictional resistance such forces being without functional relationship to the mass-volume of flow requires empirical determinations to obtain a desirable result. Stream-lined shapes and Venturi-like passages of structures wherein laminar airflow conditions are emanated eliminates impingement force and turbulence leaving only skin-friction which is negligible whereas the Venturi-like surrounding air passage adds the forces which are a function of mass-volume of air flow over such shapes.

Change of the state of airflow by throttle manipulation in such structures causes an instant differential static pressure force across the moveable member whose magnitude is a function of the proportions of projected surface areas of the moveable member to the flow-through area of the air passage(s) and of the magnitude of the structure's inertia which delays response of the system to a steady state condition consistent with the new throttle position.

Application of fueling systems to automotive engines requires adapting air-fuel mixture to steady state conditions of load and speed, and to the transitional conditions of acceleration and deceleration.

Efficient and smooth response to operational transitions without auxiliary means are inherent in the fluidic metering structures as improved by this invention and their combination with fuel controlling devices and systems for automotive engines.

SUMMARY OF THE INVENTION

The moveable members of variable Venturi structures are supported in the upstream "minimum-flow" position for movement in the downstream direction with increasing aerodynamic force as opposed by countervailing force. The shape of upstream entry surface and contours of moveable members of this invention are streamlined (approximate parabolically curved) for laminar air flow at and around the moveable member at non-turbulent velocities and through the air passage(s) which are always open and thereby minimize the effects of throttle valve manipulation on the member which creates a momentary change in the air pressure drop across the structure before such pressure drop and movement of the Venturi member stabilizes.

The fundamentals for metering and control by aerodynamic structures and variable Venturi passages of this invention are:

(1) A moveable member mounted for movement in a' tubular casing, spaced therefrom to form an annular surrounding passage for an air stream whose shape and contour being streamlined and the airstream that flows through the passage encompassing the member being at non-turbulent velocity said member is subject to aerodynamic forces proportional to volume and mass (specific density) of the airstream flowing therethrough.

(2) A moveable member mounted for movement in a tubular casing forming a Venturi passage between its outer surface contour and the inner surface of the casing section surrounding the member and optionally containing an internal Venturi passage whereby an air stream flowing around the member and through the Venturi passage(s) produces differential-velocity pressure from the Venturi passage(s) of such structure said differential pressure output being proportional to the mass-volume of the air flow.

(3) The forces on the moveable member being countervailed by a linear spring or the output of fuel pressure devices that balance with airflow force and converging contours of entry to air passages being approximately parabolic to the restricted section of the passage whereby at a stationary tap in the casing the velocity-pressure of the air stream is directly proportional to downstream displacement of the moveable member thereby providing outputs which are linearly proportional to the mass-volume of the air flow, these being:

a. displacement of the moveable member;
b. differential velocity-pressure, (Venturi-vacuum)
c. magnitude of countervailing force.

For the application of variable Venturi structures to fueling systems of modern internal combustion engines the dimension and proportions of the moveable members and air passages are determined by the maximum volume of air requirements of a particular engine which is the product of displacement and maximum speed; and at a predetermined air velocity within non-turbulent limits. At the low and idle speed, the air quantity, is determined by turn down from the maximum, and is at a low air flow rate with reduced air stream velocity.

The desired response is achieved by the sizing of air passage for non-turbulent velocity at the maximum air flow requirement and the projected cross-sectional area of the moveable member at approximately fifty percent (50%) thereof.

It is an object of this invention to improve metering systems for internal combustion engines with structures comprising streamlined shaped members movably supported in tubular casings forming Venturi-like passages around and through said member for air passage which exerts aerodynamic force on the shaped member displacing said member downstream to the extent as opposed by countervailing force, thereby producing mechanical and fluidic outputs that are proportional to mass-volume of air flow and applicable to fuel control devices and systems in naturally asperated and supercharged air supply systems.

Another object of this invention being the providing an interior passage in a moveable member for direct injection of fuel into the air stream in its optimum high velocity minimum pressure condition for maximum dispersion and homogenization of the fuel with the air stream.

Another object of this invention is to compensate for inertia of the system which delays the change of positional movement response to the sudden increasing of air flow by throttle manipulation for acceleration or sudden decrease of air flow upon deceleration, to prevent surge and oscillation and provide the means for momentary enrichment and leaning of the optimum fuel-air ratio to yield smooth bumpless performance during transitions.

In summary, it is the object of this invention to improve the range, performance and applicability of metering structures comprising streamline shaped moveable bodies in Venturi-like passages impinged and encompassed by the metered air flow in a tubular casing by linking the moveable member with a system of levers to the countervailing force with mechanical advantage to the moveable member whereby the aerodynamic force is amplified and by amplifying Venturi differential pressure by pressure-motor means applied to said system of levers countervailing force is increased accordingly and the proportional outputs are extended into the low end range for application to fueling the modern high speed high output engine and;

It is a further object of this invention to apply metering outputs of the invention with feedback means to offset inertial and transitional effects on fuel air ratio and throttle manipulation to provide the optimum performance and efficiency in all speed load conditions and modes of operation.

BRIEF DESCRIPTION OF THE DRAWINGS

For a better understanding of the invention as well as other objects and further features thereof, reference is made to the accompanying drawings, wherein:

FIG. 6 is a side elevational view in cross section of a Venturi metering structure in accordance with a second embodiment of the invention.

FIG. 7 is a top plan view of the structure of FIG. 6.

FIG. 8 is a side elevational view in cross section of a Venturi Metering structure in accordance with a third embodiment of the invention.

FIG. 9 is a sectional top plan view of the structure of FIG. 8.

DETAILED DESCRIPTION OF A FIRST EMBODIMENT

Figures 1, 3:
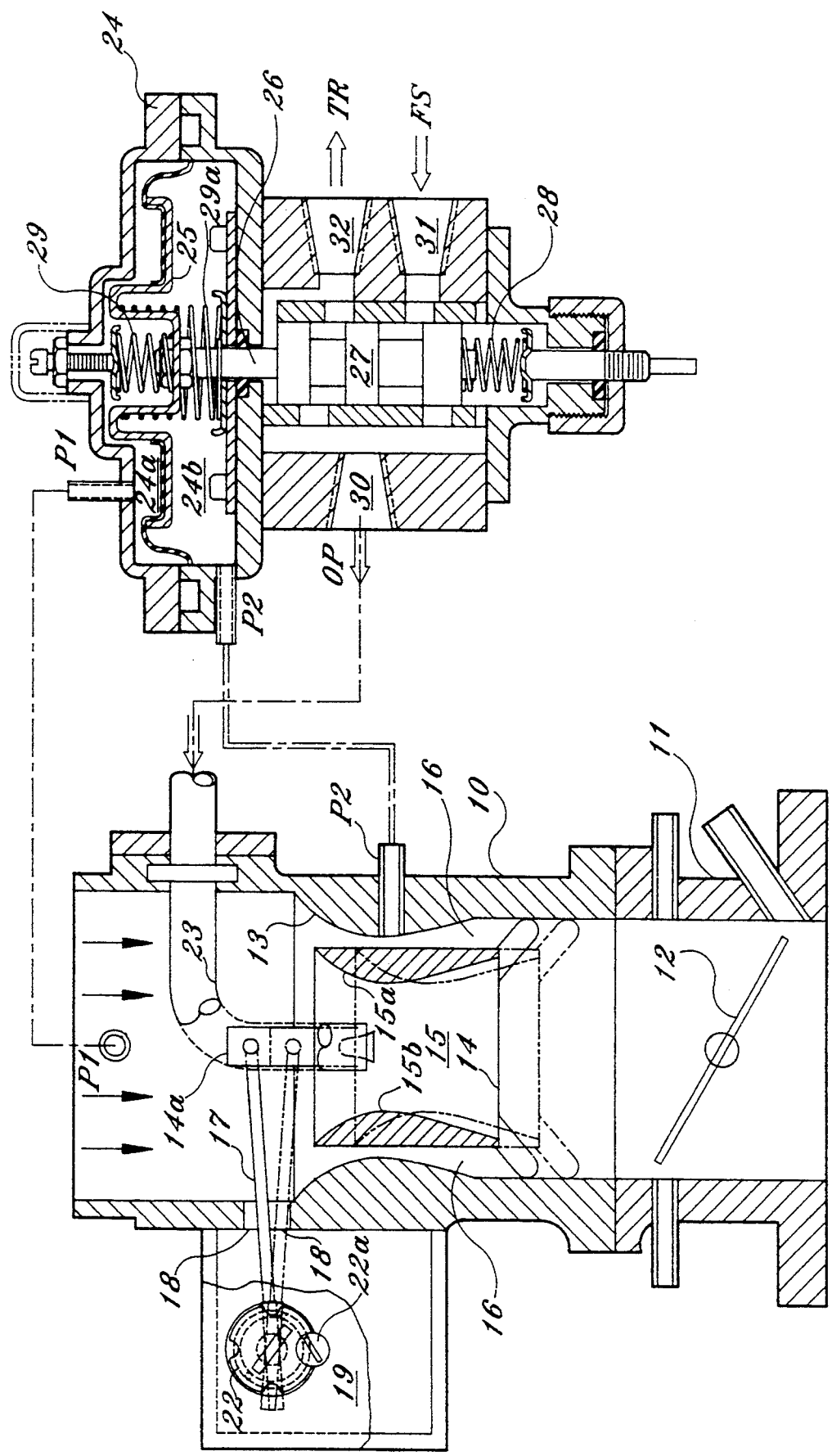
FIG. 1 is a side elevational view in cross-section of a Venturi metering structure in accordance with a first embodiment of the invention.
FIG. 3 shows a side elevational view of an air pressure transducing device for receiving a differential air pressure output signal from the device in FIG. 1.
Figure 2:
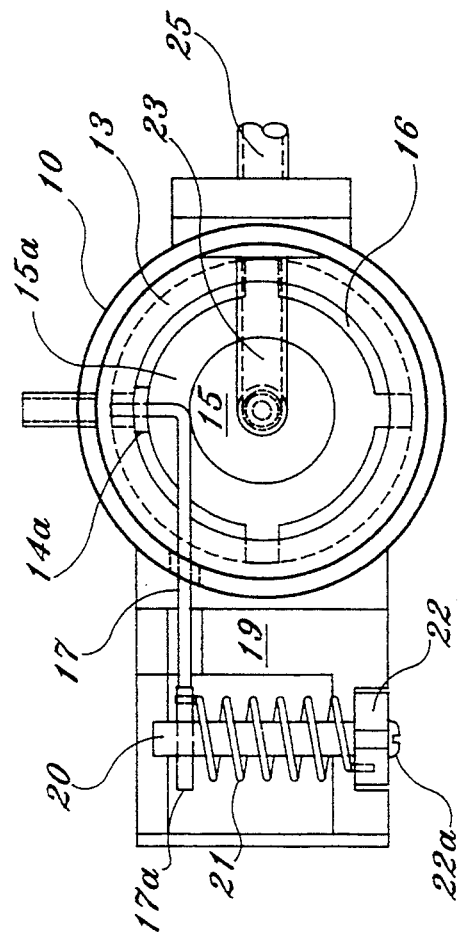
FIG. 2 is a top plan view of the structure of FIG. 1.

The invention shown in FIGS. 1 and 2 includes a tubular casing 10 into which an air stream is introduced. The lower end of casing 10 is coupled to the intake manifold 11 of an internal combustion engine through a duct having a throttle 12 therein. Disposed in the casing 10 is a section 13 having an internal Venturi contour. Mounted coaxially within Venturi section 13 of casing 10 is a cylindrical moveable member 14 whose outer surface is a true cylinder and the interior passage being a tubular Venturi passage 15. Said moveable member 14 being spaced from section 13 defines an annular exterior Venturi passage 16 formed by the Venturi contour of section 13 of the tubular casing 10 in conjunction with the exterior surface of member 14. The converging interior passage's inlet 15a and the converging surface of casing section 13 have a parabolic form leading to constricted sections 15b and 13a. Moveable member 14 is provided with a handle 14a pivotally coupled to lever 17 extending through slot 18 in casing 10 into bracket 19 mounted on casing 10. An extension 17a of lever 17 into the pivotal shaft 20 on which is mounted a helical torsion spring 21 providing mechanical advantage to flow stream force by the length of lever 17 divided by the length of 17a, being the radius of the torsion spring 21. The moveable member 14 is held in an upstream starting position by spring tension of 21 against the upstream end of slot 18 in casing 10, said spring tension constituting countervailing force to aerodynamic air stream force which is adjustable by a rotatable and locking cap 22 holding the fixed end of torsion spring 19 and secured by screw 22a.

At a location in casing 10 opposite the Venturi passage throat 15b within member 14 (member 14 is shown in its upstream starting position), a tap P2 from the annular exterior passage is provided and in conjunction with a tap P1 from the inlet casing upstream of casing section 13, the velocity air pressure differential $P1-P2$ is derived from the prevailing air flow whose aerodynamic force displaces moveable member 15. The effective throat of the varying Venturi passage produces the $P1-P2$ differential air pressure proportional to the prevailing air flow. This embodiment provides a metering output of $P1-P2$ for devices to control fuel quantity in proportion thereto and the interior Venturi passage 15 of the moveable member is available and accessible for fuel injection into the air stream where optimum conditions prevail for blending the fuel into the air stream by a single fuel injector 23 as shown.

FIG. 2 is the view looking into the first embodiment of the structure wherein the flow through air passages 15 and 16 of the internal and external Venturi passages are constant in all operable positions whereby being tortuous the cross-sectional area at the casing tap P2 increases with displacement thereby causing the air velocity pressure at tap P2 to be directly proportional to volume of air flow by the linear increase in effective throat area with the corresponding increase of air volume.

FIG. 3 presents a means to amplify and transform air stream differential pressure $P1-P2$ to proportional force for application to a fuel pressure regulating system.

The device shown in FIG. 3 is a differential-pressure motor comprising a split casing 24 sealing a diaphragm-piston 25 between an upper chamber 24a for tubularly connecting to P1 and a lower chamber 24b for tubularly connecting to P2 whereby $P1-P2$, acting on diaphragm piston 25 causes a force equal to $P1-P2$ multiplied by the area of said diaphragm-piston said force being proportional to the mass-volume of air flow through the structure of FIG. 1 and FIG. 2.

Rod 26 attached to diaphragm piston 25 applies the said proportional force derived from $P1-P2$ to the valve member in valving system 27 whereby said valve member is positioned in its valving system by amplified $P1-P2$ on the valve member and countervailed by output fuel pressure acting oppositely to the amplified $P1-P2$ force thereby the output pressure of the fuel to the injector balances said amplified $P1-P2$ force at a value proportional to the mass volume of the air flow.

Springs 28 and 29 bias the valve to a minimum fuel pressure starting position.

Discharge port 30 being tubularly connected to fuel injector 23 of FIG. 1 injects fuel into the air stream in optimum ratio thereto said ratio being adjustable by the tension of spring 21 in FIGS. 1 and 2 which increases or decreases P1−P2 and springs 28 and 29 which increases or decreases fuel pressure. The fuel regulating valve 27 is connected to a constant pressure fuel supply to port 31 and a tank return line from port 32 connected to the fuel supply tank. Spring 29a is a balancing spring. Said differential air pressure and valving system is inventor's U.S. Pat. No. 4,895,184.

Figure 5:
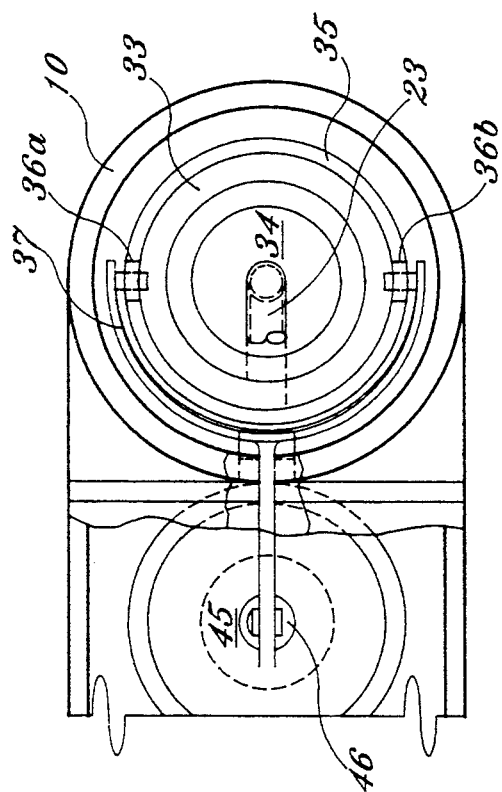
FIG. 5 is a top plan view of the structure of FIG. 4.
Figure 4:
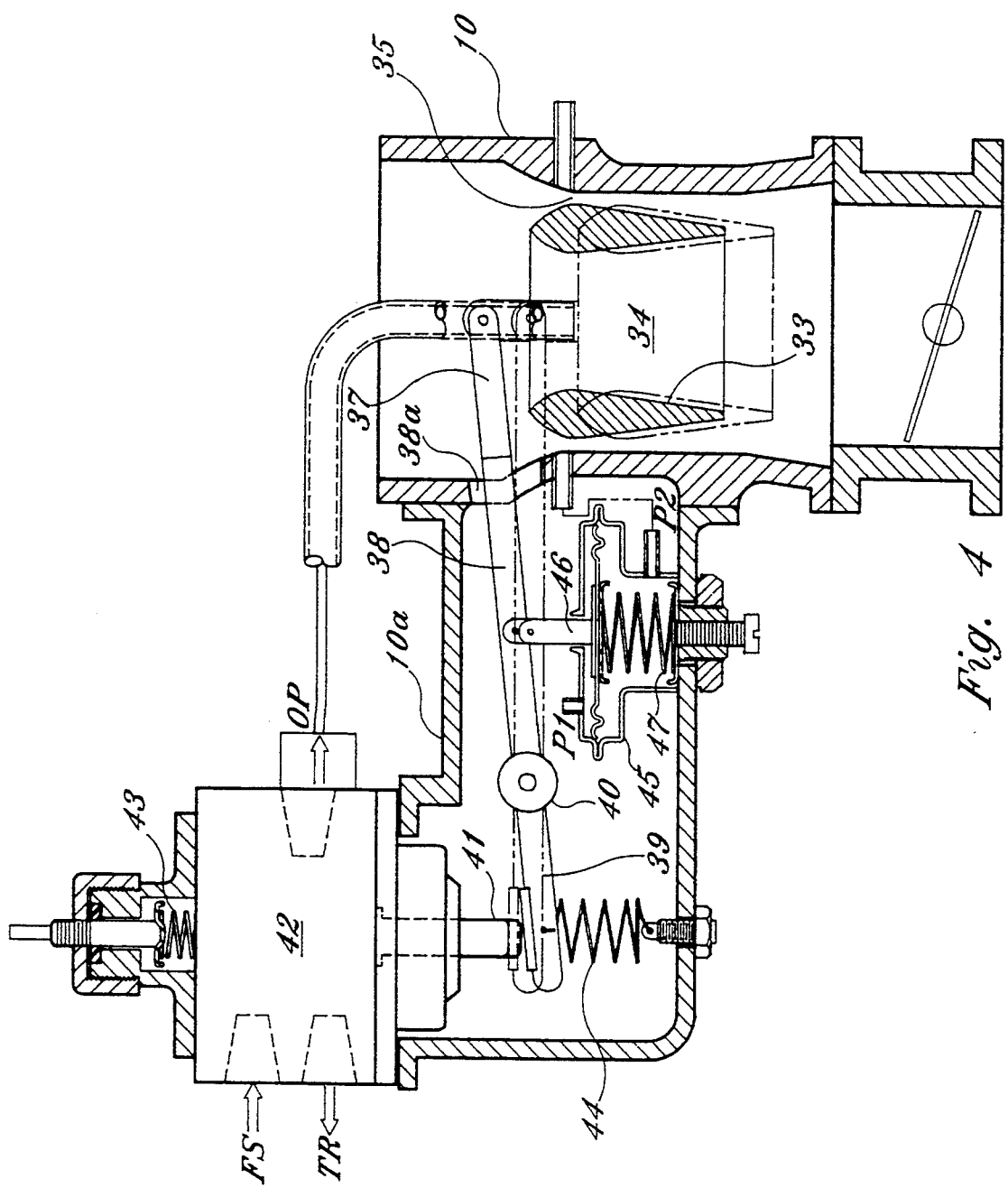
FIG. 4 is a side elevational view in cross section of a Venturi metering structure in accordance with a first embodiment of the invention.

FIGS. 4 and 5 represents an arrangement of the first embodiment whereby the fuel regulating device is controlled by mechanical transmission of the aerodynamic displacement force on the moveable member and additionally modulated by differential air pressure force P1−P2 derived from varying Venturi passages retaining the advantage of the interior air passage for direct fuel injection therein.

A cylindrical moveable member 33 having a Venturi contoured outer surface 33a which in conjunction with interior surface section 33b of tubular casing 10, forming an exterior Venturi passage 35, said member being provided with two (2) handles 36a and 36b diametrically attached to the upstream surface of said member to which a semicircular yoke 37 is pivotally attached and said yoke 37 being rigidly attached at its center point to a bar 38 which extends through a slot 38a in casing 10 whereby said bar 38 is pivotally mounted inside an extended casing 10a and supports moveable Venturi member 36 for axial movement in casing 10 within limits imposed by slot 38a.

Lever bar 38 extends beyond pivot 40 a shorter length 39 whereby the greater length of 39 and yoke 37 is a multiple of 39 thereby amplifying force on member 35 by the mechanical advantage of the length of 39 plus radius of yoke 37 divided by the length of 39 from pivot point of 40 to the point of application of the actuating stem 41 of a fuel regulating valve system 42 where it bears against lever extension 39.

Aerodynamic force of air flow through the tubular casing 10 enveloping moveable member 33 and flowing through passages 34 and 35 urges said member downstream which movement is transmitted to regulating valve 42 to increase or decrease output fuel pressure OP is countervailed by internal application of output fuel pressure OP and internal spring 43 or external spring 44 or both.

A spring return diaphragm motor 45 is mounted in casing 10a and the output stem 46 is pivotally attached to lever 38 whereby the application of differential air pressure, P1−P2 from the varying throat of passages 34 and 35 augments aerodynamic force on lever bar 38. Spring 47 in diaphragm motor 45 urges lever 38 to its upstream position against end of slot 38a.

DETAILED DESCRIPTION OF THE SECONDARY EMBODIMENT

FIGS. 6 and 7 present views of a second embodiment of the invention comprising essentially the same improved mechanical-fluidic structure but with an alternate moveable Venturi member for application to alternate fuel supply controlling means. This second embodiment comprises a tubular intake casing 10 coupled to an intake manifold 11 of an engine through a duct having a throttle 12 therein.

Tubular intake casing 10 having a section 13 whose interior surface is contoured to form a Venturi passage, a cylindrical moveable member 50 with streamlined upstream surface 50a spherically leading to side surface 50b and coaxially mounted in section 13, forms an annular Venturi passage 51 in conjunction with the surface of section 13 of tubular casing 10.

Said moveable member 50 having a handle 52 secured to the axial center of upstream surface 50a to which lever 53 is pivotally coupled and extends into casing 10a where it is pivotally mounted on pin 54 inside of casing 10a and extends beyond said pivot with a short extension 55 thereby constituting a first class mechanical lever to increase the aerodynamic forces on moveable element 50 by the length of 53 divided by the length of 55.

Moveable member 50 is held in its starting up-stream position wherein lever 53 bears against upper end of slot 53a and this start position of member 50 is at the coincidence of the widest diameter of movable member 50, occurring at the junction of the side surface 50b with top spherical surface 50a and the throat of casing section 13. This position defines the minimum throat area of the annular Venturi passage 51. This is the position for tap P2 in casing 10 from which differential air-velocity pressure (P2−P1) is derived.

A fuel pressure regulating valve 57 actuated by displacement of its controlling component is mounted whereby an exterior rod 58 of the controlling component of said regulating valve 57 bears against lever extension 55.

Aerodynamic force of airflow through the structure impinging upon, enveloping member 50 and flowing through Venturi passage 51 urges said member downstream which movement is transmitted to regulating valve system 57 by rod 58. The displacement of said valving system to increase or decrease fuel pressure output OP therefrom is countervailed by internal springs or output fuel pressure depending upon the particular fuel pressure controlling device. A biasing spring 56 adjustable by locking eye bolt 56a is applicable when the other means are unavailable.

As in FIG. 4 a spring return diaphragm motor 45 is mounted in casing 10a and the output stem 46 is pivotally attached to lever bar 53 whereby spring 47 in diaphragm motor 45 urges lever 53 to its upstream position against end of slot 53a and is adjustable by lockable screw 47a.

The application of differential air pressure, P1−P2 from the effective throat tap P2 from the passage 51 augments aerodynamic force on lever bar 53 against countervailing force of spring 47 and biasing spring 56.

The regulated fuel pressure OP by this embodiment is applied to fuel injectors into individual engine intake valve ports (ported injection) or cylinder and alternatively one injector into the intake manifold.

DETAILED DESCRIPTION OF THE THIRD EMBODIMENT

Figure 10:
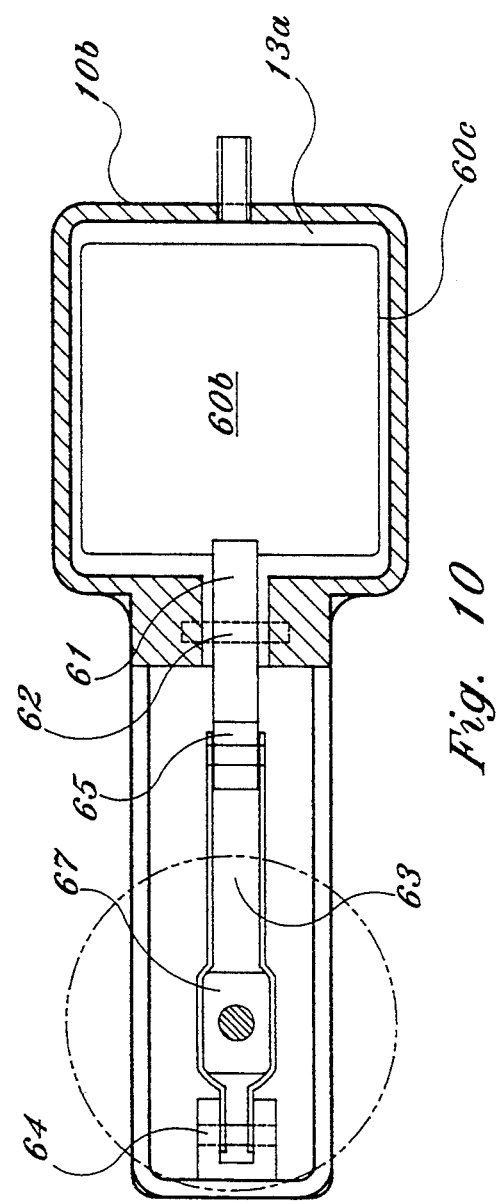
FIG. 10 presents a top plan view in cross section of the third embodiment of the invention.

FIGS. 8, 9, and 10 present views of a third embodiment of the invention. In FIGS. 8 and 9 wherein the moveable member 60 is circular and its upstream surface 60a spherically contoured facing upstream and pivotally mounted in tubular casing 10 to swing with increasing air flow to intake casing 11 as controlled by a throttle 12 and having a peripheral shape which is approximately parabolic, thereby forms a Venturi passage 13 between its peripheral surface and the cylindrical section 10 of the casing.

The Venturi passage at minimum airflow is circular and as increased airflow swings moveable member 60 the Venturi passage enlarges in the form of a crescent.

Streamlined vane member 60 provided with extension arm 61 pivots on pin 62, extends in casing 10a and held in the upstream start position by the system of lever 63 pivoting on pin 64 with roller 65 bearing on vane extension 61 with the biasing force of spring 66 being adjustable by screw cap 66a.

Lever 63 contains a free roller 67 located a short distance from pin 64 thereby providing a second class lever for a fuel regulator 68 to be applied to said roller whereby countervailing force of said regulator and biasing spring 66 thereby amplifying aerodynamic force on said member 60.

FIG. 10 presents an alternate shape of the moveable member of the third embodiment of the invention wherein the Venturi passage section of the structure 10b is rectangular and the pivotal member 60b is also rectangular with the upstream facing surface and sides 60c is circular and parabolic and providing a four sided equal space at its starting position.

Airflow generated force on this member 61c maintains the passage on three sides substantially the same whereas the side opposite pivot arm 61 presents an increasing Venturi passage 13a in conjunction with casing 10b.

It is to be noted that extension 61 of members 60 and 60b may be extended 61a whereby a countervailing spring as in the first and second embodiment serves in place of the mechanical advantage link and lever system to either activate an electrical transducer or a pressure to electric transducer from P1−P2 to provide the air metering signal for electronic microprocessor control of Electronic Fuel Injection.

Figure 11:
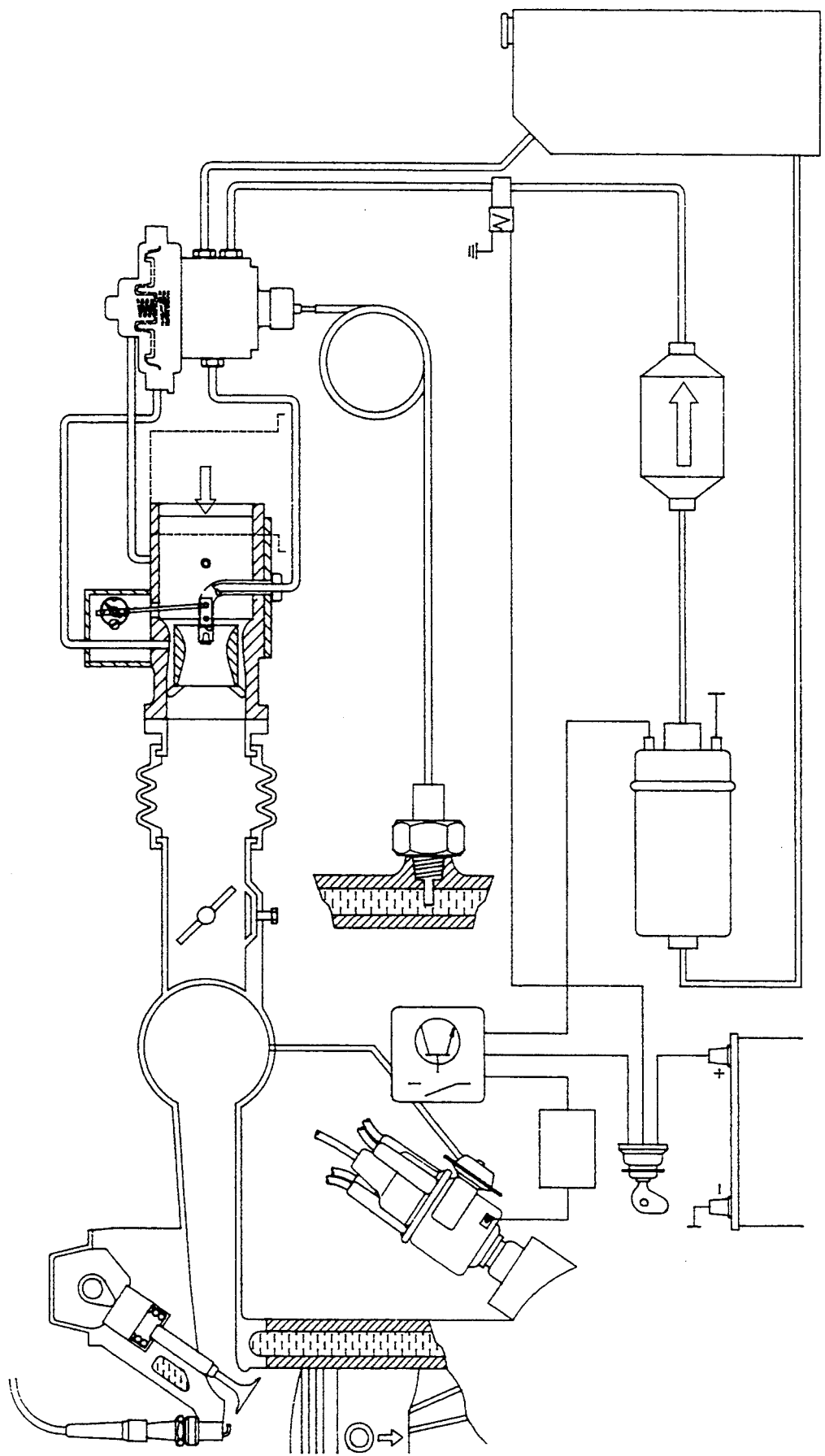
FIG. 11 diagrammatically shows a continuous single fuel injection system to an internal combustion engine including a first embodiment of the invention.
Figure 12:
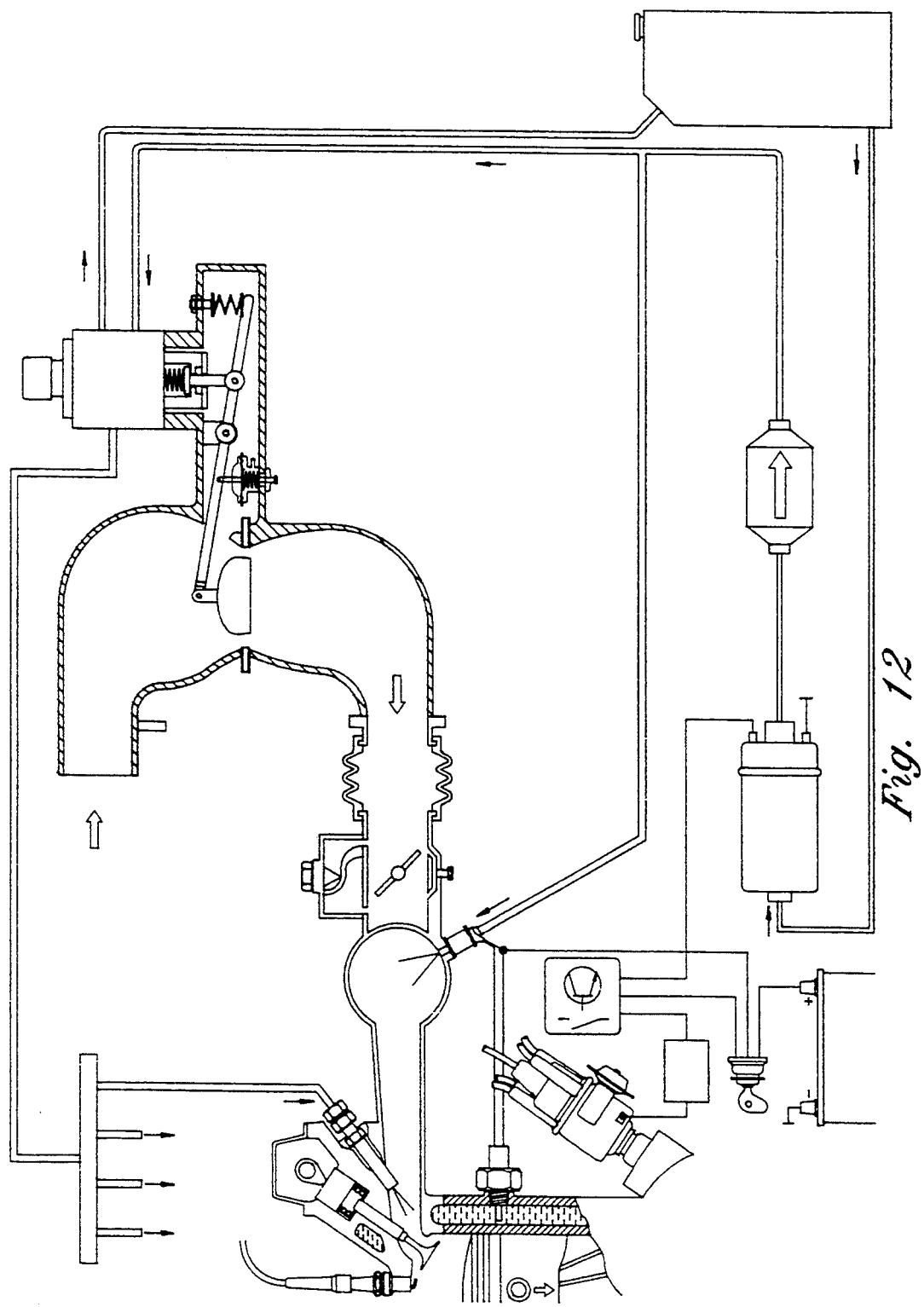
FIG. 12 diagrammatically shows a continuous ported injection system to an internal combustion engine including a second embodiment of the invention.
Figure 13:
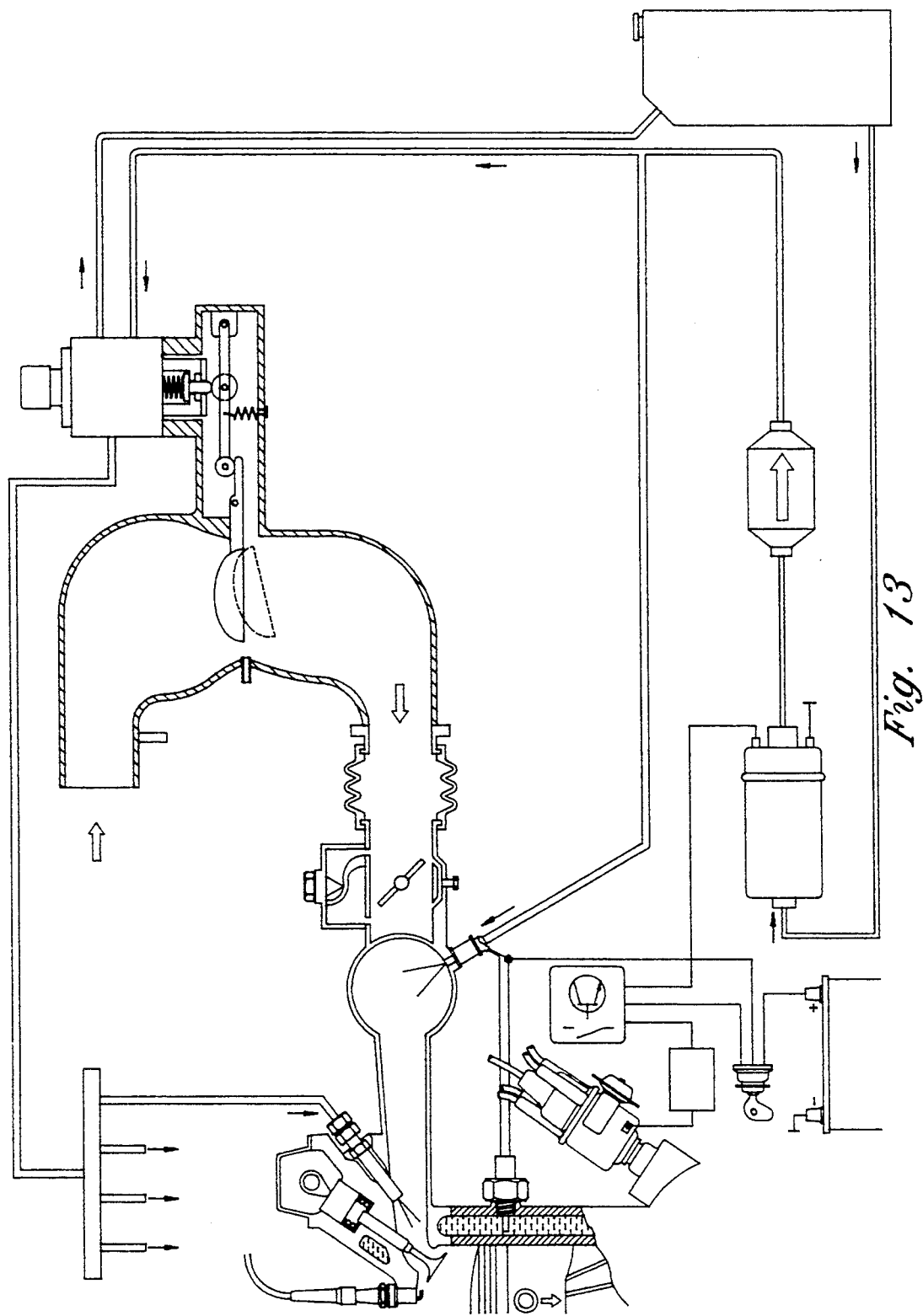
FIG. 13 diagrammatically shows a continuous ported injection system to an internal combustion engine including a third embodiment of the invention.

FIGS. 11, 12 and 13 schematically presents application of First, Second and Third embodiments of the invention in single and multiport fuel injection systems of internal combustion engines.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A variable air metering system to provide proportional outputs from low rpm to high rpm engine operation, said outputs being linearly proportional to the mass volume of an air stream passing therethrough of an internal combustion engine producing outputs for controlling fuel in an optimum fuel-air ratio thereto throughout an extended operating range from idle rpm to full speed rpm, said fuel air metering system comprising:

a tubular casing into which air is admitted, connected to said internal combustion engine as an air supply;

a movable member coaxially mounted within said tubular casing and supported and spaced therein for downstream movement, said movable member having streamlined upstream surfaces and contours which in conjunction with the interior surface contours define an annular parabolic Venturi passage in the space between said movable member and said tubular casing, whereby the air stream admitted into the casing encompasses said member and flows through said passage exerting aerodynamic force on said movable member, displacing said member in the downstream direction;

means connected to said movable member within said tubular casing for providing a countervailing force against the downstream movement of said movable member;

means to amplify the downstream aerodynamic force on said movable member including a linkage means connected to said movable member and said countervailing force means providing a mechanical advantage greater than 1:1 between said movable member and said countervailing force means; and fuel flow control valve means connected to said linkage means whereby a light force aerodynamically on said movable member by said air stream is amplified by said linkage means for providing a countervailing force connected to said fuel valve means thereby providing a proper amount of fuel relative to an optimum ratio of air-fuel mixture linearly, wherein the extent of movable member displacement is a result of the aerodynamic force provided by said air intake on the movable member and the countervailing force fuel flow control valve means, the displacement being an air metering output; and wherein said metering system includes a pressure tap P2 at the throat section of the variable venturi passage in said tubular casing and displacement of said movable member by aerodynamic force and countervailing force connected to said linkage means, said displacement yielding differential air velocity pressure between upstream intake air pressure P1 and velocity pressure tap at the throat section P2, said differential air pressure P1−P2 being an air metering output proportional to mass-volume of air stream flow, means applying force equivalent of P1−P2 to linkage means and to fuel control valve means providing fuel in optimum ratio to air from idle rpm to full speed rpm of said engines.

2. A system as set forth in claim 1, wherein said outputs are applied to a fuel flow system which provides countervailing force derived by feedback of discharge fuel pressure to injection devices.

3. A system as set forth in claim 1, wherein amplified output forces on the moveable member linked to a lever of the system operatively coupled to said moveable member with mechanical advantage being countervailed by spring means.

4. A system as set forth in claim 1, installed in an engine air induction system and applied to fuel quantity control from an engine driven or electric pump wherein the fuel quantity is regulated by means of a device responsive to an output thereof such device controlling fuel pressure to atomizing injector(s) in intake air passages thereby providing optimum fuel-to-air ratio in a continuous fuel injection system for an internal combustion engine.

5. A system as set forth in claim 1, wherein an output being applied to a fuel pressure control system supplying fuel to one injector discharging into the interior passage of the moveable member constitutes a single point continuous fuel injection system.

6. A structure as set forth in claim 1, wherein the differential velocity pressure acts on a nozzle in the interior passage of the moveable member and to a float controlled fuel reservoir through an orifice type fuel jet constituting a full range carburetor.

7. A system as set forth in claim 1, further including a transducer operatively coupled to an output of said movable member to produce an electric signal proportional to mass-volume of prevailing air flow which signal is applied to a microprocessor to control fuel quantity to electric injectors from a pump fuel supply constituting an electronic fuel injection system for an internal combustion engine.

* * * * *